April 6, 1965     L. SIMMONS     3,176,923
ACCESSORY FOR TRAVELING LAWN SPRINKLER
Filed June 28, 1963     2 Sheets-Sheet 1
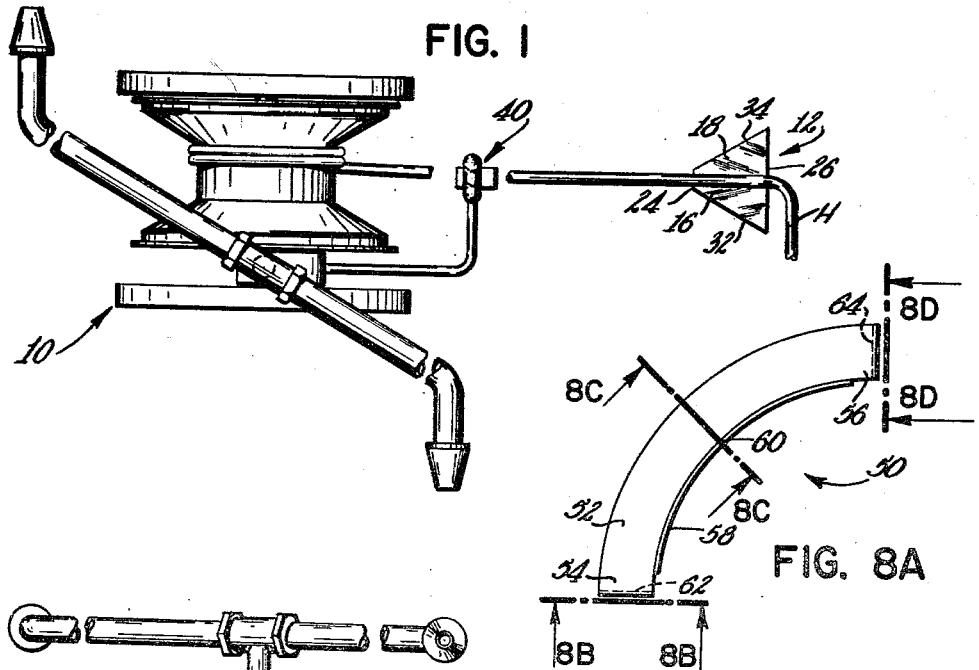
FIG. 1
FIG. 8A
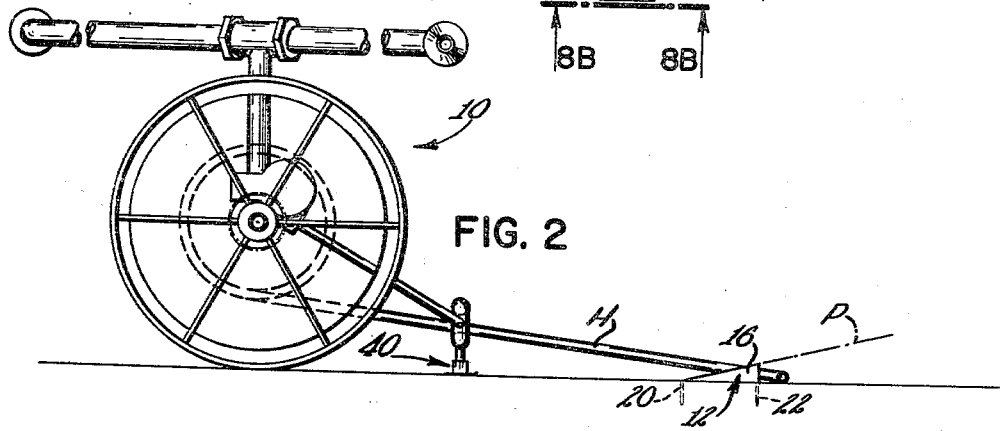
FIG. 2
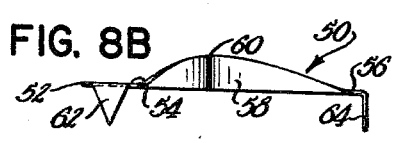
FIG. 8B
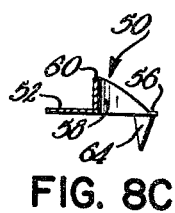
FIG. 8C
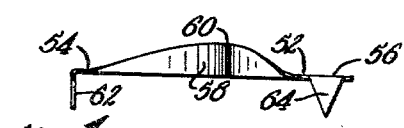
FIG. 8D
INVENTOR.
LEONARD SIMMONS
BY
Leonard H. King
ATTORNEY April 6, 1965

L. SIMMONS 3,176,923

ACCESSORY FOR TRAVELING LAWN SPRINKLER

Filed June 28, 1963

INVENTOR.
LEONARD SIMMONS

BY

Leonard H. King

ATTORNEY

Patented Apr. 6, 1965

3,176,923
ACCESSORY FOR TRAVELING LAWN
SPRINKLER
Leonard Simmons, 34 Hewlett Lane, Flower Hill,
Port Washington, N.Y.
Filed June 28, 1963, Ser. No. 291,574
9 Claims. (Cl. 239—183)

This invention relates to an accessory for a traveling lawn sprinkler and more particularly to an accessory that will assist the sprinkler in negotiating a relatively sharp turn or corner as it travels along the length of hose in a predetermined path.

Traveling lawn sprinklers are well known in the art having been disclosed, for example, in U.S. Patent No. 2,683,056, issued to Robert Helfinger. In using the Helfinger sprinkler a length of hose is set down on the lawn in a pattern determined by the area of foliage to be watered. The sprinkler reel is then driven by reaction to the pressure of the water being discharged from the rotating nozzles. The reel therefore travels along the path defined by the hose and coils the hose on the reel hub at the same time.

The prior art traveling sprinkler has been found to be of limited utility when sharp turns or corners must be traversed, such as around trees, shrubs, or the corners of buildings. This situation is particularly prevalent in small confined plots. Furthermore, since it was known that the sprinkler could not be made to travel over a hose that abruptly changed direction, because in pulling itself along the hose it pulls the hose into a shallow curve, a compromise in the desired sprinkling pattern was made that eliminated sharp bends. This caused either overwatering or underwatering of certain areas, both of which conditions are obviously undesirable and which result in a wastage of water or spoilage of plant life. Without the accessory of the present invention, the sprinkler, because it operates on a taut hose, tended to pull the hose as it traveled along. Thus, when traversing an arc having a relatively large radius, the tendency was, in the prior art, to pull the hose towards the sprinkler body as it was wound on a reel and change the arcuate path to that of a substantially chordal path or at best, an arc having a larger radius.

As an accessory to a traveling lawn sprinkler, the present invention permits a hose path having sharp turns around trees, shrubs, buildings or other obstructions that may be found adjacent to a lawn. The number of such turns is limited only by the number of attachments set into the ground. Essentially, the present invention comprises a small ramp over which the skid of the traveling sprinkler slides. The hose is hooked around a corner of the ramp in a direction corresponding to the intended travel of the sprinkler. Thus, while the sprinkler is approaching the ramp, the hose is maintained taut and in its intended path because it is hooked around the ramp. This permits the sprinkler to travel only the predetermined path. A boot affixed to the sprinkler skid allows the sprinkler skid to slide up the ramp, unhook the hose from the ramp and continue on along the new direction of the hose towards the next accessory or the hose terminus.

It is therefore an object of the present invention to provide an accessory that will permit a traveling sprinkler to make a sharp turn.

Another object is to provide a ramp member about which the hose of the traveling sprinkler may be hooked.

Still another object is to provide an accessory for a traveling sprinkler that will keep taut the hose thereof.

A further object is to provide a cornering accessory for a traveling sprinkler that may be easily placed into and be removed from the lawn.

An additional object is to provide an inexpensive accessory that will assist a traveling lawn sprinkler negotiate a sharp turn.

These and other objects, advantages and features of the present invention will, in part, be pointed out with particularity and will, in part, be apparent from the following more detailed description, taken in conjunction with the accompanying drawing forming a part thereof.

In the various figures of the drawing, like numerals designate like parts.

In the drawing:

FIG. 1 is a plan view of a traveling lawn sprinkler and an accessory thereto.

FIG. 2 is a side view of the apparatus of FIG. 1.

FIGS. 8A–8D are a plan view and elevation views of an alternative embodiment of the present invention.

Figure 3:
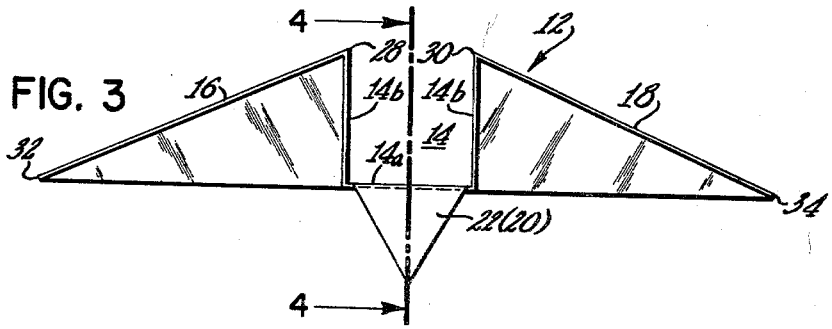
FIG. 3 is an end view of the ramp member adapted to cooperate with a traveling lawn sprinkler.

Ramp member 12 is shown as being constructed of a single piece of formed sheet metal. Ramp 12 has a central, depressed track 14 comprised of a bottom wall 14a and spaced vertical sidewalls 14b running longitudinally therethrough and sloping side members 16 and 18 depending outwardly and extending the length of the track. Locating tabs 20 and 22 are formed at ends 24 and 26, respectively, of track 14 such that they may be driven into the ground and thereby securely position the ramp.

Figure 4:
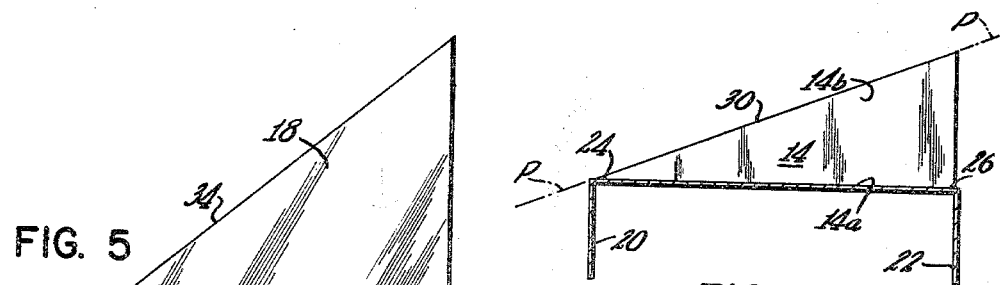
FIG. 4 is a longitudinal elevation in section taken along line 3—3 of FIG. 4.
Figure 5:
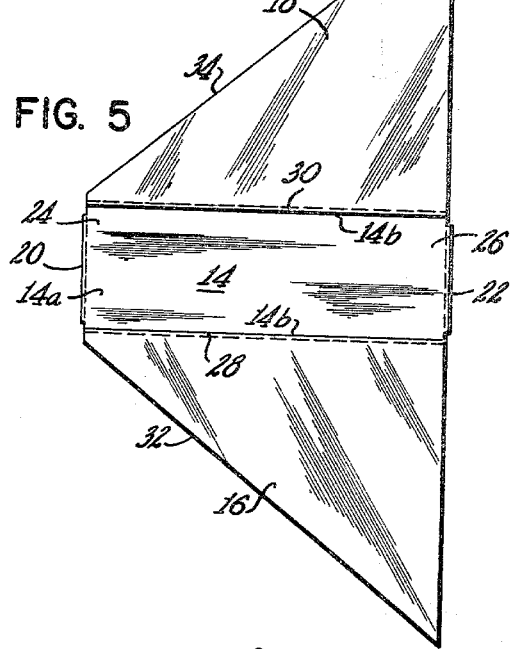
FIG. 5 is a plan view of the FIG. 3 ramp member.

As may best be seen in FIGS. 3–5, end 24 of side walls 14b is lower than end 26 of side walls 14b when tabs 20 and 22 are inserted in the ground and when the bottom wall 14a of track 14 is resting on the ground. This arrangement results in an inclined plane P defined by longitudinal edges 28 and 30 formed at the juncture of the vertical walls 14b of track 14 and sloping side members 16 and 18. As will be explained hereinafter, the skid of the sprinkler, or a boot attached thereto is adapted to ride along inclined edges 28 and 30. The inclination of the attachment is achieved by having end 24 rest on the ground when tab 20 is inserted and by having end 26 supported above ground level when tab 22 is inserted. The outermost longitudinal edges 32 and 34 of sloping side members 16 and 18 respectively, as well as the bottom wall 14a of track 14 serve to firmly support end 26 in an elevated position.

The slope of inclined plane P need not be substantially more than the diameter of hose H which is hooked about end 26. It will be seen then that as sprinkler 10 travels along and winds up the hose on its hub, it will be pulling and creating a force on the hose opposite to the direction of sprinkler travel. The hose, however, cannot be moved from its predetermined path by this force since it is captured by the attachment which is anchored in the ground at the proposed turning point. In other words, the length of hose between the moving sprinkler and the attachment will remain taut thus assuring straight line travel of the sprinkler. The point at which the sprinkler is supposed to make its turn will remain fixed.

Figure 6:
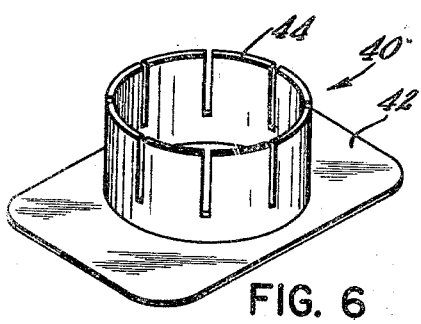
FIG. 6 is a pictorial view of a boot adapted to slide on the ramp member of FIG. 3.
Figure 7:
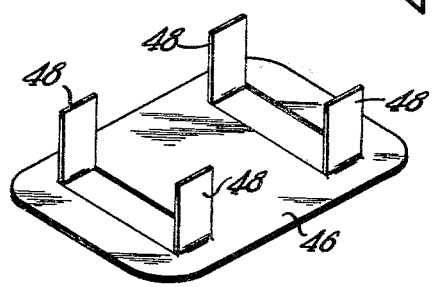
FIG. 7 is a pictorial view of another boot which may be employed with existing law sprinklers.

As the sprinkler approaches the ramp, at which point it will change direction, the skid, located at the end of the sprinkler arm 39, will be sliding on the ground. In order to unhook the hose, the skid must be elevated. It is to accomplish this movement that an inclined plane is provided. So that the skid will not inadvertently travel into track 14, a boot 40 is provided that fits over the skid. A simple boot is shown in FIG. 6 and will be seen to comprise a flat base portion 42 which is wider than track 14 and a split hub portion 44 integral with base 42. The hub portion is dimensioned such that it will frictionally engage and be clamped to the skid. For skids of other configurations, the boot clamping means would be changed, as shown in FIG. 7, to include a base member 46 having tabs 48 that may be bent over the skid to provide holding means. Of course, the boot may be eliminated entirely by fabricating the skid such that it is wider than the track. The boot is intended only as an adapter for sprinklers already sold and in use by the consumer.

The embodiment illustrated in FIGS. 8A–8D, generally denoted by reference character 50, is comprised of an arcuate base portion 52 having first and second end portions 54 and 56, respectively. Side wall 58 is similarly curved and extends substantially upright from the base portion between the first and second ends thereof. The juxtaposition of the base portion and the side wall form a track for a length of hose.

Side wall 58, in addition to being curved, is provided with a variable height. As may best be seen in FIGS. 8B–8D, the midpoint 62 of member 50 is in a higher plane than either end portions, each of which is provided with tabs 62 and 64 adapted for insertion into the ground. Thus, as the boot or skid is advanced, it will tend to ride over the elevated side wall and therefore release the length of hose positioned in the track. This action will permit the sprinkler to make the relatively sharp turn and continue along the succeeding straight portion of hose. Since member 50 is symmetrical, it can be used for both right-hand and lefthand turns.

With the boot, or skid, elevated on the inclined plane during sliding thereover, the eye of the sprinkler, positioned above the skid, will tend to raise the hose out of the track. At the end of the plane, the hose will be completely free, the skid may drop down the short distance to the ground, and the sprinkler will then be turned to continue along the predetermined path of the hose. It follows that the length of hose between spaced attachments will remain taut so that the sprinkler will continue its travel regardless of the number of turns or the sharpness of the turns.

The accessory of the present invention is simple to fabricate from metal or may be molded of plastic. It is small enough to present no storage problem and is easily inserted in the ground to define a particular pattern of sprinkler travel. The accessory accurately maintains a traveling sprinkler in a predetermined path around obstacles in a lawn as well as around corners of a building. By assuring straight line travel, only the areas desired will be watered and in addition, the sprinkler will not lock at a particular point on the hose and cause an overwatering which would result in damage to plant life as well as wastage of water.

There has been disclosed heretofore the best embodiment of the invention presently contemplated and it is to be understood that various changes and modifications may be made by those skilled in the art without departing from the spirit of the invention.

What is claimed is:

1. In combination with a traveling lawn sprinkler of the class described having a skid adapted to travel along the ground in a predetermined path defined by the length of hose associated therewith,
    (A) an elongated ramp member adapted to be positioned on the ground in the path of the hose at a point where the hose makes a sharp turn,
        (a) said ramp member having first and second ends and a central portion,
            (1) said first end being substantially at ground level,
            (2) said second end being spaced from said first end,
            (3) said central portion being positioned higher than said first end;
            (4) a portion of the length of hose being releasably engaged by said ramp member along the length thereof, the sprinkler being adapted to traverse the full length of said ramp member to thereby release the hose and permit the sprinkler to follow the succeeding length of hose; and
    (B) locating means depending from said ramp member whereby said ramp member may be fixed in position on the ground at the point where said sprinkler is intended to turn; and
    (C) a boot clamped to the skid of said sprinkler, said boot being adapted to slide along the length of said ramp.

2. The apparatus of claim 1 including an arcuate wall substantially perpendicular to said ramp member.

3. The apparatus of claim 1 wherein said boot comprises a flat base portion and skid gripping means integral therewith.

4. The apparatus of claim 3 wherein said skid gripping means comprises a plurality of tabs, said tabs being deformable about said skid whereby said boot is retained integral therewith.

5. The apparatus of claim 3 wherein said skid gripping means comprises a tubular portion having a plurality of slits therein, said tubular portion being adapted to frictionally engage and integrally retain said boot on said skid.

6. An accessory for a traveling lawn sprinkler adapted to travel on the ground the sprinkler having rotating nozzles and a ground engaging skid adapted to follow a length of hose set out on the ground in a predetermined pattern, said accessory comprising:
    (A) an elongated ramp member adapted to be positioned on the ground in the path of the hose at a point where the hose makes a sharp turn,
        (a) said ramp member having first and second ends and a central portion, said ramp member having a track extending along the longitudinal centerline thereof between said first and second ends, said track being adapted to receive a length of hose therein,
            (1) said first end being substantially at ground level,
            (2) said second end being spaced from said first end,
            (3) said central portion being positioned higher than said first end,
            (4) a portion of the length of hose being releasably engaged by said attachment along the length of said ramp member, the skid of the sprinkler being adapted to traverse the full length of said ramp member to thereby release the hose and permit the sprinkler to follow the succeeding length of hose; and
    (B) locating means depending from said ramp member whereby said ramp member may be fixed on the ground at the point where the sprinkler is intended to turn.

7. An accessory for a traveling lawn sprinkler adapted to travel on the ground the sprinkler having rotating nozzles and a ground engaging skid adapted to follow a length of hose set out on the ground in a predetermined pattern, said accessory comprising:
    (A) an elongated ramp member adapted to be positioned on the ground in the path of the hose at a point where the hose makes a sharp turn,
        (a) said ramp member having first and second ends and a central portion, said ramp member having a track extending along the longitudinal centerline thereof between said first and second ends, said track being defined by a bottom wall and two spaced walls substantially vertical to said bottom wall, (B) a pair of sloping side members depending outwardly and downwardly from the top of said spaced, vertical walls of said track,
   (a) said sloping side members extending between said first and second ends,
      (1) said first end being substantially at ground level,
      (2) said second end being spaced from said first end,
      (3) said central portion being positioned higher than said first end,
      (4) a portion of the length of hose being releasably engaged by said attachment along the length of said ramp member, the skid of the sprinkler being adapted to traverse the full length of said ramp member to thereby release the hose and permit the sprinkler to follow the succeeding length of hose; and (C) locating means depending from said ramp member whereby said ramp member may be fixed in a position on the ground at the point where the sprinkler is intended to turn.

8. In combination with a traveling lawn sprinkler of the class described the sprinkler being adapted to travel along the ground in a predetermined path defined by the length of hose associated therewith, (A) an elongated ramp member adapted to be positioned on the ground in the path of the hose at a point where the hose makes a sharp turn,
   (a) said ramp member having first and second ends and a central portion, said ramp member having a track extending along the longitudinal centerline thereof between said first and second ends, said track being adapted to receive a length of hose therein,
      (1) said first end being substantially at ground level,
      (2) said second end being spaced from said first end,
      (3) said central portion being positioned higher than said first end,
      (4) a portion of the length of hose being releasably engaged by said ramp member along the length thereof, the sprinkler being adapted to traverse the full length of said ramp member to thereby release the hose and permit the sprinkler to follow the succeeding length of hose; and (B) locating means depending from said ramp member whereby said ramp member may be fixed in position on the ground at the point where the sprinkler is intended to turn.

9. In combination with a traveling lawn sprinkler of the class described the sprinkler being adapted to travel along the ground in a predetermined path defined by the length of hose associated therewith, (A) an elongated ramp member adapted to be positioned on the ground in the path of the hose at a point where the hose makes a sharp turn,
   (a) said ramp member having first and second ends and a central portion, said ramp member having a track extending along the longitudinal centerline thereof between said first and second ends, said track being defined by a bottom wall and two spaced walls substantially perpendicular to said bottom wall, (B) a pair of sloping side members depending outwardly and downwardly from the top of said spaced walls of said track,
   (a) said sloping side members extending between said first and second ends,
      (1) said first end being substantially at ground level,
      (2) said second end being spaced from said first end,
      (3) said central portion being positioned higher than said first end,
      (4) a portion of the length of hose being releasably engaged by said ramp member along the length thereof, the sprinkler being adapted to traverse the full length of said ramp member to thereby release the hose and permit the sprinkler to follow the succeeding length of hose; and (C) locating means depending from said ramp member whereby said ramp member may be fixed in position on the ground at the point where the sprinkler is intended to turn.

References Cited by the Examiner

UNITED STATES PATENTS

| | | | |
|---|---|---|---|
| 1,275,395 | 8/18 | Corbett | 254—190 |
| 1,658,202 | 2/28 | Jones | 239—189 |
| 1,709,883 | 4/29 | Schwarzkopf | 254—190 |
| 1,714,957 | 5/29 | Johnson | 254—190 |
| 1,919,703 | 7/33 | Nielsen | 239—183 |
| 2,548,326 | 4/51 | Sparks et al. | 239—183 |
| 2,558,663 | 6/51 | Olschewski | 239—261 |
| 2,575,828 | 11/51 | Muench | 239—183 |
| 2,602,696 | 7/52 | Salatin | 239—183 |
| 2,683,056 | 7/54 | Hilfinger | 239—183 |
| 2,707,655 | 5/55 | Steen | 239—183 |
| 2,722,454 | 11/55 | Jepson | 239—189 |
| 2,835,531 | 5/58 | Egly | 239—183 |
| 2,896,762 | 7/59 | Stansbury | 193—41 |

FOREIGN PATENTS

| | | |
|---|---|---|
| 620,459 | 1/48 | Great Britain. |

EVERETT W. KIRBY, *Primary Examiner.*

RAPHAEL M. LUPO, *Examiner.*